United States Patent
Kelly et al.

(10) Patent No.: US 6,583,387 B2
(45) Date of Patent: *Jun. 24, 2003

(54) HEATING APPARATUS FOR A WELDING OPERATION AND METHOD THEREFOR

(75) Inventors: Thomas J. Kelly, Cincinnati, OH (US); Keith B. Alexander, Cincinnati, OH (US); Rabon Hensley, Erlanger, KY (US); Robert D. Lawrence, Hamersville, OH (US); John H. Snyder, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/939,946

(22) Filed: Aug. 27, 2001

(65) Prior Publication Data

US 2002/0005394 A1 Jan. 17, 2002

Related U.S. Application Data

(63) Continuation of application No. 09/472,117, filed on Dec. 23, 1999, now Pat. No. 6,297,474.

(51) Int. Cl.[7] .................................................. B23K 9/16
(52) U.S. Cl. ............ 219/137 R; 219/75; 219/137 WM; 228/232
(58) Field of Search ................. 219/137 WM, 219/137 R, 72, 74, 75; 228/230, 232, 262.71

(56) References Cited

U.S. PATENT DOCUMENTS

| | | | |
|---|---|---|---|
| 3,188,446 A | 6/1965 | Ray et al. | 219/72 |
| 5,106,010 A | 4/1992 | Stueber et al. | 228/232 |
| 5,170,027 A | 12/1992 | Brodersen | 219/72 |
| 5,319,179 A | 6/1994 | Joecks et al. | 219/137 R |
| 5,685,771 A | 11/1997 | Kleppen | 219/72 |
| 5,897,801 A | 4/1999 | Smashey et al. | 219/127 |
| 6,020,571 A | 2/2000 | Grossklaus, Jr. et al. | 228/230 |
| 6,054,672 A | 4/2000 | Foster et al. | 219/121.66 |
| 6,124,568 A | 9/2000 | Broderick et al. | 219/137 WM |
| 6,297,474 B1 * | 10/2001 | Kelly et al. | 219/137 WM |

* cited by examiner

Primary Examiner—Clifford C. Shaw
(74) Attorney, Agent, or Firm—David L. Narciso; Gary M. Hartman; Domenica N.S. Hartman

(57) ABSTRACT

A heating apparatus and method for pre-weld heat treating, welding and post-weld heat treating a superalloy article in a single enclosure while avoiding oxidation of the article. The enclosure is preferably equipped with a one-way valve that permits the escape of gases, but otherwise seals the enclosure to prevent the ingress of air during welding and heat treatment as a result of thermal gradients induced when the article is inductively heated. To provide access to the article and a device used to weld the article, the enclosure is equipped with gloves by which the welding device and the article can be manipulated while a nonreactive atmosphere is fully maintained within the enclosure and the article is inductively heating.

18 Claims, 1 Drawing Sheet

HEATING APPARATUS FOR A WELDING OPERATION AND METHOD THEREFOR

This continuation patent application claims priority to U.S. patent application Ser. No. 09/472,117, now U.S. Pat. No. 6,297,474.

FIELD OF THE INVENTION

BACKGROUND OF THE INVENTION

High temperature cobalt and nickel-based superalloys are widely used to form certain components of gas turbine engines, including combustors and turbine vanes and blades. While high-temperature superalloy components are often formed by casting, circumstances exist where superalloy components are preferably or are required to be fabricated by welding. For example, components having complex configurations, such as turbine midframes and shroud support rings, can be more readily fabricated by welding separate castings together. Because the cost of components formed from high-temperature cobalt and nickel-based superalloys is relatively high, restoring and repairing these components is typically more desirable than replacing them when they become worn or damaged. As a result, welding is also widely used as a method for restoring blade tips, and for repairing cracks and other surface discontinuities in superalloy components caused by thermal cycling or foreign object impact. To improve yields, superalloy components are often welded while maintained at an elevated temperature, e.g., in excess of about 1500° F. (about 815° C.)

Superalloy components of gas turbine engines must generally be thermally stress-relieved before welding to relax residual stresses present from engine service, and then stress-relieved after welding to relax residual stresses induced during cool down from the welding operation. Heat treatment also provides stress relief by dissolution of a portion of hardening gamma prime ($\gamma'$) in $\gamma'$-strengthened nickel-base superalloys. Generally, the heat treatment parameters will vary depending on the alloy of interest, the amount of residual stress relief and dissolution required, furnace design, component geometry and many other factors. The ramping rates, soak temperatures, hold times and cooling rates for stress relief and dissolution heat treatments are critical in order to obtain the desired stress relief without adversely affecting the superalloy and its properties.

In the past, pre-weld and post-weld heat treatments have been performed in large batch heat treatment furnaces to ramp and hold a group of components at a suitable heat treatment temperature. Drawbacks to the use of batch heat treatment processes include long heat treatment times due in part to the mass of the large batch furnace and the mass of the typically large number of components being heat treated. Additionally, long queuing times occur while batches are assembled as individual components are repaired. Therefore, use of batch furnace pre-weld and post-weld stress relief heat treatments represent a time delay to the flow of components through a welding line, and is an inefficient method to metallurgically condition components for welding.

As a solution to the above, U.S. Pat. No. 6,124,568 to Broderick et al. teach an apparatus and method for heat treating and welding superalloy components. More particularly, the apparatus enables pre-weld and post-weld heat treatments to be performed on a component within the same enclosure in which the welding operation is performed. The enclosure is used in conjunction with a memory storage device that stores appropriate pre-weld and post-weld heat treatment temperature profiles and a welding temperature profile for the component. The apparatus further includes a control by which the output of the device used to heat the component is adjusted based on the component temperature and according to the preestablished pre-weld and post-weld heat treatment temperature and the welding temperature profiles.

While overcoming the prior art requirement for batch heat treatments, use of the apparatus taught by Broderick et al. has encountered difficulties associated with oxidation of the component being welded. While sealed along its four side walls and base, the enclosure taught by Broderick et al. is required to be open at its top in order to gain access to and weld the component within. Though Broderick et al. flow an inert gas up through the enclosure, and employ an overhead exhaust hood for drawing away the inert gas and fumes generated during the welding operation, oxidation of superalloy components has nonetheless occurred. Accordingly, further improvements to the apparatus taught by Broderick et al. are necessary to improve weld quality and yields, in addition to achieving improved processing efficiency for manufacturing, restoring and repairing superalloy components by welding.

BRIEF SUMMARY OF THE INVENTION

The present invention generally provides a heating apparatus and method for pre-weld heat treating, welding and post-weld heat treating a superalloy article in a single enclosure while avoiding oxidation of the article. In contrast to Broderick et al., the present invention employs an enclosure that prevents the ingress of air into the enclosure during welding and heat treatment.

According to this invention, oxidation of a superalloy article can occur with the apparatus of Broderick et al. as a result of Broderick et al. using an open-top enclosure, which was believe to be necessary to allow an operator to perform the welding operation on an article within the enclosure. However, intense heating of a superalloy article by induction is believed to create sufficient thermal gradients immediately around the heated portion of the article, that the resulting turbulence draws air downwardly into the enclosure through the opening in the enclosure, even though inert gas is continuously flowed upward through the enclosure and out through the top into an overhead exhaust hood. The enclosure of this invention is equipped with a valve that permits gases within the enclosure to escape, but is otherwise sealed to prevent air from being drawn into the enclosure. To provide access to the article and the device used to weld the article, the present invention provides gloves attached to the enclosure by which the welding device and the article can be manipulated while a nonreactive atmosphere is fully maintained within the enclosure and the article is inductively heating. As a result, in addition to eliminating the processing drawbacks known for batch-type pre-weld and post-weld heat treatments of superalloy articles fabricated, restored or repaired by welding, the present invention also prevents the oxidation of such articles while at the high temperatures required for welding and heat treatment.

Other objects and advantages of this invention will be better appreciated from the following detailed description.

DETAILED DESCRIPTION OF THE INVENTION

Figure 1:
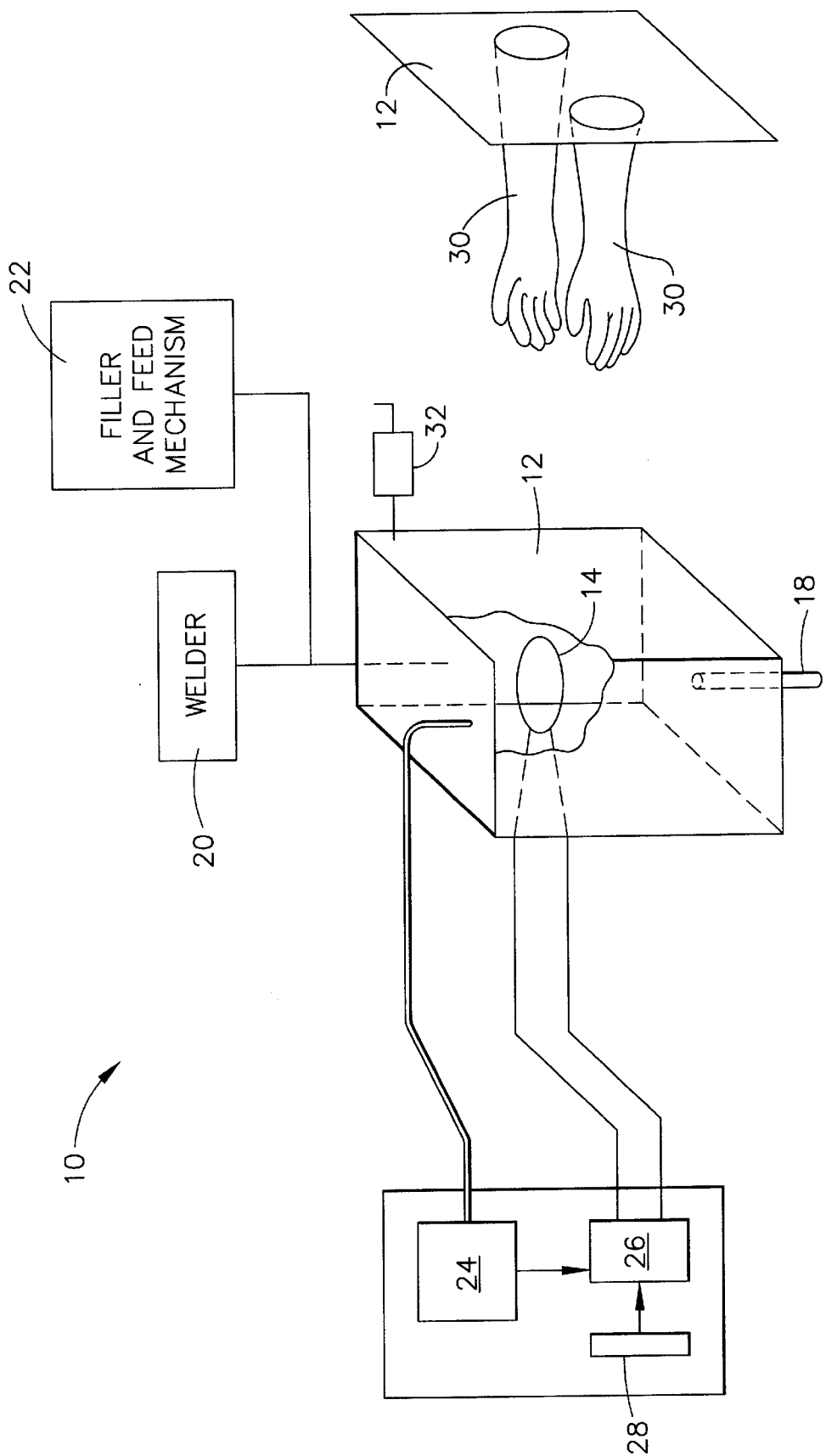
FIG. 1 is a schematic representation of a combination heat treatment and welding apparatus in accordance with this invention.

The present invention is generally directed to superalloy articles that undergo a welding operation during their fabrication, restoration or repair. While the advantages of this invention will be described with reference to components of gas turbine engines, the invention is also applicable to a variety of applications in which an article is to be heat treated before and after welding in a manner that will not degrade the properties of the article.

An apparatus 10 for performing the heat treatments and welding operation of this invention is schematically depicted in FIG. 1. The apparatus 10 includes an enclosure 12 specially adapted for performing a welding operation such as tungsten inert gas (TIG) or plasma transferred arc (PTA) welding in a controlled atmosphere. The apparatus 10 is also shown to include an induction heating coil 14 of a type known in the art. The coil 14 is preferably sized and shaped to closely surround a very localized region of an article being welded so that uniform and rapid heating of the localized region occur. The enclosure 12 also includes an inlet 18 through which an inert gas (such as argon) is fed from below to the interior of the enclosure 12, so that an inert atmosphere envelopes the article while at the elevated processing temperatures of this invention. A one-way flow control valve 32 is shown attached to one wall of the enclosure 12, through which the inert gas and fumes can be exhausted from the enclosure 12 while preventing air from being drawn into the enclosure 12. Finally, the apparatus 10 is shown to include a welder 20. The welder 20 is preferably a TIG or PTA welder, though it is foreseeable that other welding systems could be used. The filler material may be in the form of a superalloy wire whose composition is metallurgically compatible with that of the article and appropriate for the operating environment of the article. Notably absent from the apparatus 10 is an access opening to the interior of the enclosure 12, and an exhaust hood for removing fumes generated during the welding operation.

According to the invention, the apparatus 10 further includes a pair of gloves 30 attached to one of the walls of the enclosure 12 so that the article being welded and/or the welder 20 can be manipulated within the enclosure 12. The gloves 30 eliminate the prior requirement for an opening in the enclosure 12 to permit access to the welder 20 and the article being welded. As a result, with the exception of the one-way valve 32, the enclosure 12 remains sealed while the article is at an elevated temperature to prevent air surrounding the enclosure 12 from being drawn into the enclosure 12 due to severe thermal gradients or other potential causes.

The apparatus 10 of this invention is preferably employed to perform pre-weld and post-weld heat treatments on superalloy articles welded within the enclosure 12. Before welding, an article first undergoes heat treatment within the enclosure 12 to relax residual stresses present as a result of the severe service of the article and, if the article is formed of a γ'-strengthened nickel-base superalloy, to provide alloy softening by dissolution of a portion of the hardening γ' phase. Following welding, the article undergoes a second heat treatment within the enclosure 12 to relax any residual stresses induced during the welding operation. In accordance with Broderick et al., the welding apparatus 10 of this invention preferably enables control of the temperature and time profile within the enclosure 12 in a manner that facilitates pre-weld and post-weld stress relief heat treatments and welding within the enclosure 12 using a single variable-temperature thermal exposure, instead of separate batch and welding furnaces as required in the past. The preferred process carried out in the welding apparatus 10 preferably does not involve cooling the article between temperature cycles, but instead cools the article directly from a pre-weld temperature profile to a lower-temperature welding profile, and then reheats the article directly from the welding profile to a post-weld temperature profile, as described in Broderick et al., which is incorporated herein by reference. The pre-weld and post-weld profiles preferably do not include constant-temperature soaks. The result is not only a reduced cycle time by eliminating cool downs to room temperature, but also shorter heat treatment cycles before and after welding. However, it is foreseeable that pre-weld and post-weld treatments performed with the apparatus 10 of this invention could include soaks.

The above operational capabilities require the ability to detect the temperature of the article within the enclosure 12 with suitable temperature sensing equipment 24, preferably multiple optical pyrometers, though it is foreseeable that one or more standard-type K thermocouples could be used. The temperature signal from the sensing equipment 24 is used as input to a programmable temperature controller 26, which compares the signal from the equipment 24 to the desired pre-weld, weld and post-weld profiles stored in memory 28 for the article. The control signal to the induction coil 14 is then regulated based on the difference between the desired temperature profile and the temperature of the article. In this manner, essentially any temperature profile required for a given superalloy article can be programmed and accurately controlled to achieve the objects of this invention. The use of two or more pyrometers is preferred by this invention to monitor the uniformity of the article temperature and to prevent cycling of the induction coil 14 if one of the pyrometers senses a false temperature for the article, as would happen if the weld arc crosses the optical path of a pyrometer. For this reason, the controller 26 is preferably programmed to ignore a temperature spike reported by a pyrometer.

In view of the above, it can be seen that the present invention enables a superalloy article to be heat treated and welded within a single sealed enclosure 12 that prevents the article from being oxidized while at elevated heat treatment and welding temperatures. Accordingly, the invention achieves a more reliable process for performing three discrete high-temperature operations in a single thermal cycle. While discussed in terms of processing superalloy articles, the apparatus 10 of this invention could also be employed for the treatment and welding of other materials and articles whose processing requires accurate control at elevated temperatures to avoid degradation of the article properties. Therefore, while the invention has been described in terms of a preferred embodiment, it is apparent that other forms could be adopted by one skilled 35 in the art. Accordingly, the scope of the invention is to be limited only by the following claims.

What is claimed is:

1. A method of welding an article, the method comprising the steps of:

providing an enclosure;

placing the article to be welded in the enclosure;

sealing the enclosure with the exception of means that allows gases to be vented from the enclosure but prevents air or other gases surrounding the enclosure from being drawn into the enclosure;

establishing a nonreactive atmosphere in the enclosure;

while the enclosure remains sealed except for the allowing and preventing means, heating the article in the enclosure;

while the enclosure remains sealed except for the allowing and preventing means, welding the article in the enclosure;

venting fumes from the enclosure with the allowing and preventing means during the heating and welding steps; and preventing air or other external gas from being drawn into the enclosure with the allowing and preventing means during the heating and welding steps.

2. The method of claim 1 wherein the step of heating comprises inductively heating the article.

3. The method of claim 1 wherein the step of venting comprises providing one way flow of fumes from the enclosure.

4. The method of claim 1 wherein the step of preventing air or other external gas from being drawn into the enclosure during heating comprises providing a glove device for manipulating the article in the enclosure.

5. The method of claim 1, wherein the article is heated by induction coils that surround the article.

6. The method of claim 5 wherein the welding step is performed with a welding device selected from the group consisting of tungsten inert gas and plasma transferred arc.

7. A method of welding an article, the method comprising the steps of:

establishing a pre-weld heat treatment temperature profile, a welding temperature profile, and a post-weld heat treatment temperature profile for a superalloy article;

providing an enclosure;

placing the article in the enclosure;

sealing the enclosure with the exception of one-way flow means that allows gases to be vented from the enclosure but prevents air or other gas surrounding the enclosure from being drawn into the enclosure;

providing a nonreactive atmosphere in the enclosure;

heating the article in the enclosure according to the pre-weld heat treatment temperature profile;

without removing the article from the enclosure, heating the article from the pre-weld heat treatment temperature profile to the welding temperature profile;

welding the article while maintaining the temperature of the article according to the welding temperature profile; and then without removing the article from the enclosure, heating the article from the welding temperature profile to the post-weld heat treatment temperature profile;

wherein during the heating and welding steps, the enclosure remains sealed except for the one-way flow means, fumes are vented from the enclosure with the one-way flow means, and air or other external gas is prevented by the one-way flow means from being drawn into the enclosure.

8. The method according to claim 7, wherein the welding temperature profile consists of temperatures below the pre-weld heat treatment temperature profile.

9. The method according to claim 7, wherein the welding temperature profile consists of temperatures below the post-weld heat treatment temperature profile.

10. The method according to claim 7, wherein the welding temperature profile consists of temperatures below the pre-weld and post-weld heat treatment temperature profiles.

11. The method according to claim 7, wherein the pre-weld and post-weld heat treatment temperature profiles are characterized by the absence of a constant temperature soak.

12. The method according to claim 7, further comprising sensing the temperature of the article with multiple optical pyrometers.

13. The method of claim 7 wherein at least one of the steps of heating comprises induction heating with induction coils surrounding the article.

14. A welding apparatus comprising:

an enclosure for containing an article to be welded;

means for sealing the enclosure to prevent air or other gases surrounding the enclosure from being drawn into the enclosure;

means for allowing gases to be vented from the enclosure while preventing air or other gases surrounding the enclosure from being drawn into the enclosure;

a heater disposed within the enclosure for heating the article;

a memory device for storing multiple temperature profiles;

a temperature sensor for measuring the article temperature within the enclosure;

a controller associated with the heater for heating the article based on the temperature of the article according to at least two of the multiple temperature profiles; and a welding device for welding the article while the article is disposed in the enclosure;

wherein the enclosure is adapted to provide venting of fumes generated during heating and welding of the article, and wherein the enclosure is adapted to prevent air or other external gas from entering the enclosure during welding.

15. The apparatus according to claim 14 wherein the heater comprises an induction heater.

16. The apparatus according to claim 14 wherein the memory device comprises a pre-weld heat treatment temperature profile, a welding temperature profile, and a post-weld heat treatment temperature profile.

17. The apparatus according to claim 14 comprising a glove device associated with the enclosure for manipulating the welding device and the article within the enclosure.

18. The apparatus according to claim 14, wherein the sealing and allowing means comprises a one way valve associated with the enclosure.

* * * * *